Jan. 8, 1957  E. P. THIAS  2,777,039
RESISTOR ELEMENTS ADAPTED FOR USE IN CONNECTION WITH PRINTED CIRCUITS
Filed June 29, 1954  2 Sheets-Sheet 1
FIG. 1
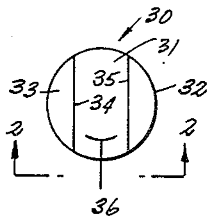
FIG. 3
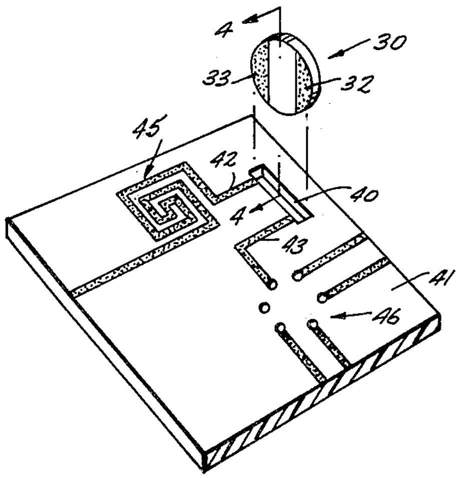
FIG. 2
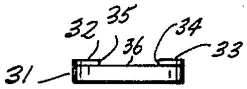
FIG. 4
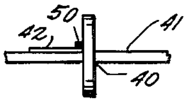
FIG. 5 FIG. 6 FIG. 7 FIG. 8
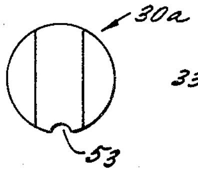
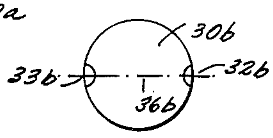
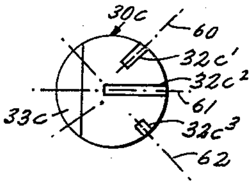
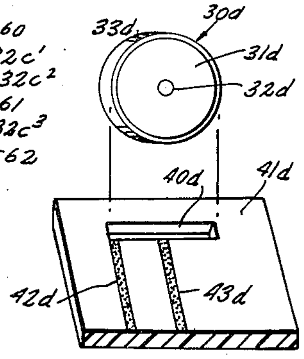
FIG. 9
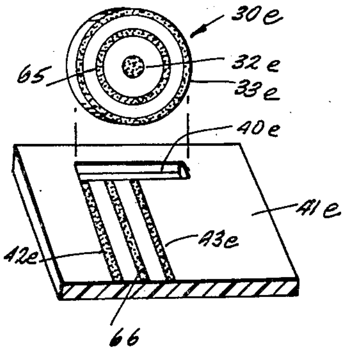
INVENTOR.
EDWIN P. THIAS
BY
Ostrolenk & Faber
ATTORNEYS Jan. 8, 1957

E. P. THIAS 2,777,039

RESISTOR ELEMENTS ADAPTED FOR USE IN CONNECTION WITH PRINTED CIRCUITS

Filed June 29, 1954

2 Sheets-Sheet 2

INVENTOR.
EDWIN P. THIAS

BY

Ostrolenk & Faber

ATTORNEYS

United States Patent Office 2,777,039

Patented Jan. 8, 1957

2,777,039

RESISTOR ELEMENTS ADAPTED FOR USE IN CONNECTION WITH PRINTED CIRCUITS

Edwin P. Thias, Los Angeles, Calif., assignor to Standard Coil Products Co., Inc., Los Angeles, Calif., a corporation of Illinois Application June 29, 1954, Serial No. 440,070

7 Claims. (Cl. 201—63)

My present invention relates to resistors and more particularly to resistors of the type which are essentially ceramic compositions. Resistors of this type include generally compositions which comprise various clays, carbon, metal titanates, silicon carbide, and oxides of metals such as copper, iron, cobalt, nickel, manganese, titanium, and zirconium.

More specifically, my invention is directed to the physical conformation of said resistors so that they will lend themselves particularly for use in connection with printed circuits and so that they may readily be secured in appropriate electrical engagement on or in printed circuit structures.

My invention contemplates the formation of resistor elements by processes well-known in the art of manufacturing such resistors. Thereafter appropriate sections of the resistor may be coated in any suitable manner with a conductive material such as a deposit of silver, which conducting material will lend itself readily to soldering and in which the spacing between adjacent conductive coatings will determine the resistance of the unit.

By this means, therefore, a basic resistor unit may be made for various resistor applications with the resistor units all made by standard processes in standard sizes or standard groups of sizes; thereafter by appropriate coating of the conducting contact surface on areas of each set of resistors, each such set of resistors by appropriate spacing between the conductive coatings on each of the resistors may be given a predetermined value of resistance different from other sets of resistors. Therefore, it will not be necessary to specifically form, cut, shape or otherwise construct each resistor element to a different size or conformation for each variation in resistance, but rather standard sizes may be used and the variation in resistance may be obtained by the spacing between the conductive coatings.

The conductive coatings may be placed on the resistors in any suitable manner as, for instance, by a machine of the type disclosed in Patent No. 2,664,066, assigned to the assignee of the present invention or by any other mass production method of coating or depositing a silver surface.

In prior printed circuit structures where a higher value of resistance was to be used than could be obtained by shaping of the circuit element, printed or otherwise, impressed on a base, a standard resistance unit in capsule form or other appropriate form was independently soldered to appropriate leads on the printed circuit base. This required individual treatment of each of the solder leads and individual manual operation.

My invention contemplates the formation of a printed circuit so that a specific recess is provided therein to receive the above-mentioned resistor unit with the leads on the printed circuit base extending to the recess. The resistor unit which is appropriately coated as above pointed out so that the spacing between elements of the coating determines the resistance is then placed in the recess with the opposite coating elements physically adjacent to the leads on the printed circuit exetending to the recess.

All resistors which are to be secured in the circuit are by this means positioned in the appropriate recesses.

The entire printed circuit unit with the resistor elements in place may now be dip soldered with the solder adherent only to the actual connections between lead elements on the printed circuit and silver surfaces on the resistor unit.

By this means, therefore, a mass production resistor unit may be achieved which in turn may be mounted in or on a printed circuit base by mass production methods.

Preferably in practicing my invention, the resistor unit is made as a wafer or disc and coated on one surface at diametrically opposed areas of the surface. The disc is then inserted in the recess in the dielectric plate carrying the printed circuit and the dip soldering operation is performed. By appropriate coatings and spacing of the coatings on the wafer, various types of resistance networks may also be obtained from a single disc.

The primary object of my invention is, therefore, the provision of a simple ceramic resistance unit coated at opposite spaced areas on one or more surfaces with a conductive material such as silver, the spacing between opposite coatings determining the resistance and the coatings providing a surface to which solder will adhere so that a dip soldering operation may be used to effect an inter-connection between the resistor and circuit leads on a printed circuit base.

The foregoing and many other objects of my invention will become apparent in the following description and drawings in which:

Figure 1 is a side view of my novel resistor.

Figure 2 is an end view of my novel resistor taken at line 2—2 of Figure 1.

Figure 3 is a view in perspective of my resistor and the circuit member in which it is to be mounted.

Figure 4 is a cross-sectional view taken at line 4—4 of Figure 3 with the unit fully assembled.

Figures 5, 6, and 7 are side views of modified forms of my novel resistor.

Figure 8 is a view of another form of my novel resistor showing the same in combination with a circuit member in connection with which it is to be used.

Figure 9 is a view of another modified form of my novel resistor showing the same in combination with a circuit member in connection with which it is to be used.

Figure 10:
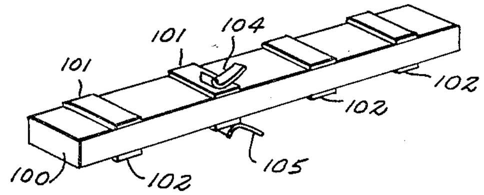

Figure 10 is a view in perspective of another form of resistor made in accordance with my invention.

Figure 11:
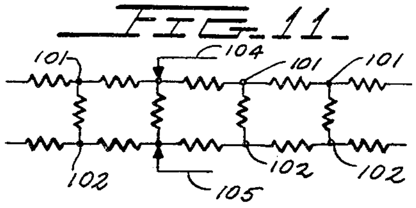

Figure 11 is a schematic of one of the circuits possible with the construction of Figure 10.

Figure 12:
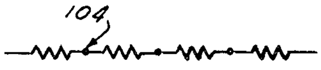

Figure 12 is a a schematic of another of the circuits possible with the construction of Figure 10.

Figure 13:
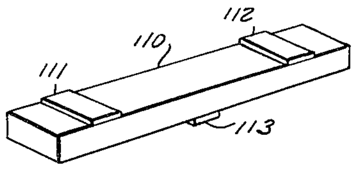

Figure 13 is a view in perspective of another modified form of resistor unit made in accordance with my invention.

Figure 14:
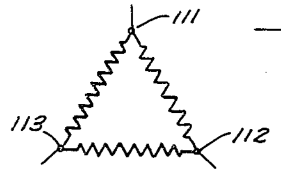
Figure 15:
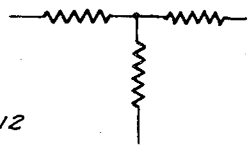
Figures 16, 17:
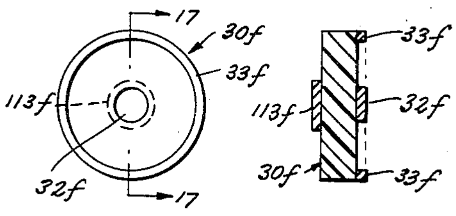

Figures 14 and 15 are schematic circuit diagrams of the circuits made possible by the unit of Figures 13 and 16.

Figure 17 is an end view taken from line 17—17 of Figure 6.

Figure 18:
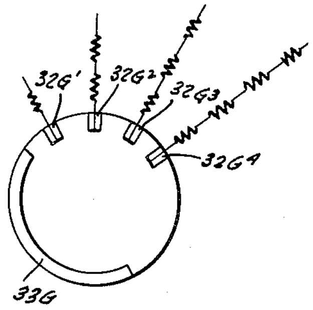

Figure 18 is a modification of the construction of Figure 7 showing another form of my novel resistor.

Figure 19:
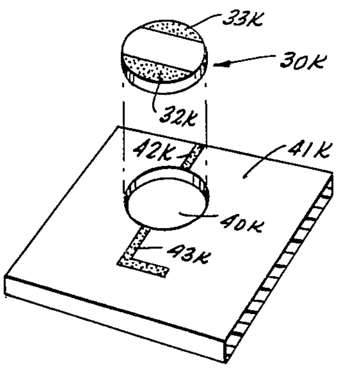

Figure 19 is a view in perspective showing a modified method of utilizing any of the resistors of Figures 1, 5, 6 and 7.

Figure 20:
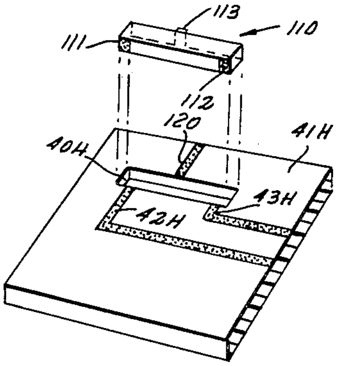

Figure 20 is a view in perspective showing the means by which a unit of the type of Figure 13 may be mounted in position.

Figure 21:
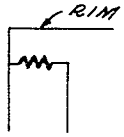
Figure 22:
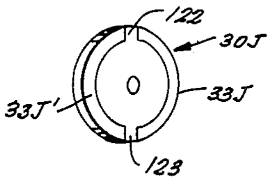

Figure 21 is a schematic of the circuit possible with the resistor units of Figures 8 and 22.

Figure 22 is a view of a further modified form of resistor showing a modification over the construction of Figure 8.

Figure 23:
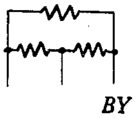

Figure 23 is a schematic of the circuit possible with a unit of the type of Figure 22.

Referring to the drawings, the resistor unit 30 shown in Figure 1 is the basic unit of my invention. It comprises a main body 31 of semi-conductive material of the type which will form a relatively high resistance path. Such materials may consist of various metal titanates, silicon carbide and oxides of metals such as copper, iron, cobalt, nickel, manganese, titanium, zirconium and other resistive materials known in the art.

The main body 31 is coated on one side with an adherent silver coating 32, 33, the coated sections 32, 33 each extending preferably to the edge of the main body 31 but each terminating at a boundary line 34, 35 on the main body so that an area 36 on the main body is left uncoated between them. Such coatings may be applied by any of several well-known coating processes or apparatus, one example of which is shown in the above-mentioned patent.

The material to form the coating may consist of well-known silver solutions or suspensions which when dry form a coating of silver which is highly conductive and highly adherent to the main body portion 31. Other materials and methods, known in the art, may be utilized to deposit a coating by electrical, chemical or mechanical means, which coating may be a conductive metal capable of being soldered or otherwise electrically connected in a circuit.

It will now be obvious that if leads are connected to the sections 32 and 33 of the resistor 30, the resistance of the unit in the circuit will be determined by the resistance between the most closely adjacent portions of borders 35 and 45 of the opposite coating.

The resistor body 31 may be formed by any of the ceramic processes well known for forming such members but instead of capping or mechanically securing connecting elements at the ends of the resistor unit, the coating process may be utilized to coat a portion of the resistor unit on each side of the center, the spacing between the two coatings forming the resistance and the coatings themselves providing a surface to which a soldering operation may cause a conductor readily to adhere. Since the soldering operation will cause no adherence to the section of resistor body 31 between the edges 34 and 35, a dip soldering operation may be utilized to effect interconnection of the leads with the resistor.

As shown in Figure 3, the resistor unit 30 may now be positioned in a slot 40 or other positioning element in the panel or base 41 of a printed circuit member having appropriate leads 42 and 43 extending up to the slot or positioning member 40 and connected to desired leads or circuit components 45, 46.

When the resistor 30 is mounted in the slot 40 of base 41 as seen in Figure 4, a dip soldering operation will cause a nodule of solder 50 to interconnect the lead 42 and coating 33, while another nodule of solder will connect the lead 40 with coating section 32 on the resistor. The entire resistor 30 will now be connected between the leads 42 and 43 and will be enabled to serve its function as a resistor in the entire circuit.

The tremendous economy and simplification achieved by my invention will be evident from the fact that in many printed circuit units a large number of resistors are required all of which may be positioned in the manner shown in Figures 3 and 4 prior to a dip soldering operation and then interconnected with their various leads by a single dip soldering operation.

Again it is pointed out that the resistance is determined by the shortest distance between edges 34 and 35 of the coatings. These coatings may be simply planar films on one side, thereby simplifying the operation of manufacture quite materially.

In practice, a large number of discs 31 of uniform size may be made and by being passed through coating machines, which will apply different areas of coating, units having a resistance of different ohmic value may be obtained. Where desired, as hereinafter pointed out, coatings may be placed on opposite sides either for change in the length of the resistance path or for other circuit purposes.

Essentially, however, the body 31 may be formed by known ceramic processes and other processes used for forming resistive members of this type. Uniform sized resistors may be formed or uniform sets of sizes of resistors may be formed with again the resistance being varied for any particular group of resistors by variations in the pattern of the coating.

Where it is desirable to use machines to load the resistors 30 into the slots 40 of the printed circuit elements and to index the resistor unit so that the coatings 32 and 33 will be in physical contact with the leads 40 and 42 for each resistor, an indexing notch 53 may be formed in the body of the resistor as shown in Figure 5.

The coatings as above pointed out may be of various types and various sizes. Thus, in Figure 6 the resistor unit **30*b* is shown as having coatings of very small area 33*b* and 32*b* on each side to provide substantially the maximum resistive path 36*b*** between them.

It is conceivable also that the coatings may be placed on opposite edges of the disc, but this would be substantially less convenient than the application of coatings to a single surface of the disc. In appropriate cases where, however, maximum resistance for the particular size disc is to be obtained, the coatings may be placed on opposite edges.

Various conformations are possible for various purposes. Thus, in the construction of Figure 7, the resistor unit **30*c* has a plurality of coatings 33*c* and 32*c*₁, 32*c*₂ and 32*c*₃. In this case, the distance between coating 33*c* on one side and the different coatings 32 on the other side vary. If the resistor unit 30*c* is inserted in the slot so that diameter 60 thereof is aligned with the leads, then the resistance path will be determined by the distance between the most closely adjacent edges of coating 32*c*₁ and coating 33*c***.

If the resistance unit **30*c* is inserted in the slot with the diameter 61 coinciding with the edge of the slot and the opposite leads, then the resistance of the unit will be determined by the most closely adjacent portions of coatings 33*c* and 33*c*₂**.

Similarly for the diameter 62, the resistance will be determined by the most closely adjacent portions of coatings **33*c* and 32*c*₃**. By this means, a single resistor unit may be utilized for a multiplicity of different resistors with different resistor functions.

Where mechanical insertion of the resistor unit **30*c* is to be made in the slot, this may be greatly facilitated by the utilization of an indexing notch such as the indexing notch 53** of Figure 5. Other indexing means including means responsive to the angular position of a particular coating may be utilized to determine the appropriate angular position of the resistor on insertion in the slot.

In Figure 8 I have shown a resistor unit **30*b* which has a most convenient conformation for the purpose of indexing the same for insertion in a slot but which, however, utilizes at the maximum somewhat less than half of the resistance value available on the entire resistance disc 31*d***.

In this case, one electrode **32*d* is obtained by coating a small area at the center of the disc and the other electrode 33*d* is obtained by coating an annular portion adjacent the edge of the disc. When resistor unit 30*d* is then positioned in slot 40*d* of printed circuit member 41*d*, then irrespective of the angular position of the disc, as long as the disc is inserted to the proper depth, the coated center 32d will always contact the center lead 43*d*** and the edge portion 33*d* of the disc will always contact the lead 42*d*.

A variation of the unit of Figure 8 is shown in Figure 9 where the resistor unit 30*e* in addition to the annular rim portion 33*e* and the center portion 32*e* is provided with the intermediate annular coating 65. When placed in the slot 40*e* of printed circuit member 41*e*, coating 32*e* will engage the lead 43*e*, coating 33*e* will engage the lead 42*e* and coating 65 will engage the lead 66. The circuit for this unit is seen in Figure 23.

Here again, the multiplicity of resistances and leads are not dependent on the specific angular position which the disc assumes provided it is inserted to the proper depth.

I have described my invention heretofore in connection with disc members primarily because high production equipment is readily available for the formation of such discs. Such equipment has been used for the formation of the dielectric elements of disc type coated capacitors wherein a capacitor, as is well known, must be coated with an electrode on both sides. Obviously, plates of any shape, as well as discs, may be used.

My invention makes possible the utilization of such equipment including a coating machine for making resistors. It will be obvious, however, that various shapes of units having a body 31 formed of a resistive substantially ceramic type of material may be made and coated in a similar manner in order to provide the resistive function.

In Figure 10 I have shown a further variation of my invention in which a main body 100 which may be rectangular or any other suitable shaping may be formed from the semi-conductive highly resistive material. A plurality of spaced coatings 101, 101 and 102, 102 are provided on each side. The member 100 may be made slidable with respect to contacts 104, 105 or a pair of contacts 104, 105 may be made independently or simultaneously slidable with respect to the main body 100.

The contacts by moving with respect to the main body 100 as shown in the schematic circuit diagram of Figure 11 will establish different circuit connections for the resistance, the unit of Figure 10 acting as a ladder type resistor network.

It will be obvious also that a variable resistance unit may be obtained by the spaced coatings on one side of the block 100 to produce a unit having a circuit substantially like that shown in Figure 12.

In Figure 13 I have shown another modification 110 of the resistance block 100 of Figure 10 in which two spaced coatings 111 and 112 are provided on one side and another coating 113 is provided on the other side. These when appropriately connected in a circuit member will provide a delta or star circuit of the type shown in Figures 14 and 15.

Such a delta or star circuit of the type shown in Figures 14 and 15 can also be provided by the disc member 30*f* of Figures 16 and 17 in which the rim coating 33*f* and the center coating 32*f* on one side are supplemented by the central coating 113*f* on the other side. When the resistor 30*f* of Figures 16 and 17 is dropped into a slot 40*d* of Figure 8, a circuit like that of Figure 21 is obtained.

When, however, an additional lead is provided on the other side of the slot 40*d* axially aligned with the lead 43*d* of Figure 8, then a circuit like that of Figures 14 and 15 is obtained.

In Figure 18 I have shown a modified form of the construction shown in Figure 7 wherein an annular coating 33*g* on one side may be registered with diametrically opposite spot coatings $32g_1$, $32g_3$, and $32g_4$. The type of resistance circuit obtained is shown as to each of the spot coatings by a small schematic extending from the diameter through the said coating on the figure. It happens that the shortest resistance path is that measured counterclockwise from each of the spot coatings 32*g* to the annular ring coating 33*g*. There is another parallel resistance path clockwise which, while it is of greater resistance, lowers the net resistance somewhat. In fact, there are a plurality of such parallel resistance paths, but the net resistance is increased for different angular positions of the disc of Figure 18 by a predetermined amount.

Here again in the construction of Figure 18, a mechanical indexing element such as the notch 53 of Figure 5 may be used or electrical indexing means coacting with the various coatings may be utilized.

In Figure 20 I have shown how a member 110 of the type of Figure 13 may be positioned in a slot 40*h* of a printed circuit member 41*h* so that the various coatings may coact with and be dip soldered to the leads 42*h*, 43*h* and 120.

In Figure 22 I have shown a modification of the resistor of Figures 8 and 9 wherein the annular coating comprises two parallel circuit members 33*j* and $33j_1$ spaced by the gaps 122, 123. The disc 33*j* of Figure 22 may be used in the manner already described for Figure 8 to produce a circuit like that of Figure 21 but may also be used with three leads, one at each end of the slot and one at the middle of the slot, to produce the figure shown in Figure 23.

In Figure 19 I have shown a modified method of using any of the discs of Figures 1, 5, 6, 7 and 18 where instead of a slot in which the disc is inserted edgewise, an indentation 40*k* is provided in the base plate 41*k* matching the disc 30*k* in outline. The disc 30*k* is laid in the slot so that the coatings 33*k* and 32*k* register with the leads 43*k* and 43*k* on the base plate 41*k*.

The dip soldering operation serves to connect the unit 33*k* in the circuit and also to hold it in place. In each of the above instances the dip soldering operation serves to hold the unit in place. However, by the means shown in Figure 19, no special mechanical support of any kind is required for the disc while it is being dipped.

By this means, therefore, a simplified method of manufacture and use of semi-conductive resistors of the type herein described is obtained. Known equipment is used in the formation of the disc or other resistor units and known equipment is used for applying the coating. The coating may preferably be provided on one side only to furnish a contact element which may be dip soldered or otherwise connected to leads on the base plate. A resistor unit is thus formed which is inexpensive to manufacture and which itself simplifies the assembly operation.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A printed circuit unit having a dielectric base, a recess in said dielectric base; circuit leads extending to portions of said recess; a solid electrical resistor having a plurality of spaced coatings of a high electrical conductivity solder adherent material; the resistance of the unit being determined by the spacing between adjacent coatings which are connected into a circuit; said resistor being mounted in said recess with coated portions of said resistor registering with said circuit leads on said dielectric base.

2. A printed circuit unit having a dielectric base, a recess in said dielectric base; circuit leads extending to portions of said recess; a solid electrical resistor having a plurality of spaced coatings of a high electrical conductivity solder adherent material; the resistance of the unit being determined by the spacing between adjacent coatings which are connected into a circuit; said resistor being mounted in said recess with coated portions of said resistor registering with said circuit leads on said dielectric base, and solder connections between said leads and said coated portions of said resistor establishing electrical connection to said resistor and securing said resistor to said base.

3. A printed circuit unit having a dielectric base, a recess in said dielectric base; circuit leads extending to portions of said recess; a solid electrical resistor having a plurality of spaced coatings of a high electrical conductivity solder adherent material; the resistance of the unit being determined by the spacing between adjacent coatings which are connected into a circuit; said coatings of the resistor forming with the resistor a resistance network unit comprising a plurality of resistances each having a value determined by the spacing between each of the coatings and the other coating; said resistor being mounted in said recess with coated portions of said resistor registering with said circuit leads on said dielectric base, and solder connections between said leads and said coated portions of said resistor establishing electrical connection to said resistor and securing said resistor to said base.

4. A printed circuit unit having a dielectric base, a recess in said dielectric base; circuit leads extending to portions of said recess; a solid electrical resistor having a plurality of spaced coatings of a high electrical conductivity solder adherent material; the resistance of the unit being determined by the spacing between adjacent coatings which are connected into a circuit; said coatings comprising a plurality of angularly spaced coatings; said resistor being mounted in said recess with coated portions of said resistor registering with said circuit leads on said dielectric base, and solder connections between said leads and said coated portions of said resistor establishing electrical connection to said resistor and securing said resistor to said base.

5. A printed circuit unit having a dielectric base, a recess in said dielectric base; circuit leads extending to portions of said recess; a solid electrical resistor having a plurality of spaced coatings of a high electrical conductivity solder adherent material; the resistance of the unit being determined by the spacing between adjacent coatings which are connected into a circuit; said coatings comprising a plurality of concentric coatings; said resistor being mounted in said recess with coated portions of said resistor registering with said circuit leads on said dielectric base, and solder connections between said leads and said coated portions of said resistor establishing electrical connection to said resistor and securing said resistor to said base.

6. A printed circuit unit having a dielectric base, a recess in said dielectric base; circuit leads extending to portions of said recess; a solid electrical resistor having a plurality of spaced coatings of a high electrical conductivity solder adherent material; the resistance of the unit being determined by the spacing between adjacent coatings which are connected into a circuit; said coatings comprising a central area and an annular coated area; said resistor being mounted in said recess with coated portions of said resistor registering with said circuit leads on said dielectric base, and solder connections between said leads and said coated portions of said resistor establishing electrical connection to said resistor and securing said resistor to said base.

7. A printed circuit unit having a dielectric base, a recess in said dielectric base; circuit leads extending to portions of said recess; a solid electrical resistor having a plurality of spaced coatings of a high electrical conductivity solder adherent material; the resistance of the unit being determined by the spacing between adjacent coatings which are connected into a circuit; said resistor comprising a disc; indexing means on said disc between adjacent coatings; said resistor being mounted in said recess with coated portions of said resistor registering with said circuit leads on said dielectric base; said indexing means determining the orientation of said disc in said recess, and solder connections between said leads and said coated portions of said resistor establishing electrical connection to said resistor and securing said resistor to said base.

References Cited in the file of this patent

UNITED STATES PATENTS

| | | |
|---|---|---|
| 2,407,251 | Christensen | Sept. 10, 1946 |
| 2,450,997 | Shann | Oct. 12, 1948 |
| 2,528,113 | Carlson et al. | Oct. 31, 1950 |
| 2,695,351 | Beck | Nov. 23, 1954 |